3,826,690
METHOD OF PROCESSING ALUMINUM
ELECTRICAL CONDUCTORS
Warren Edward Bleinberger, Towson, Edward Louis Franke, Jr., Perry Hall, John Vernon Galloway, Timonium, George William Richardson, Glen Burnie, and Albert Richard Thomas, Baltimore, Md., and Palmer Doyle Thomas, Tucker, Ga., assignors to Western Electric Company, Incorporated, New York, N.Y.
Continuation of abandoned application Ser. No. 118,677, Feb. 25, 1971. This application Oct. 22, 1971, Ser. No. 191,628
Int. Cl. C21d 1/26, 1/40, 7/00
U.S. Cl. 148—11.5 A                    10 Claims

ABSTRACT OF THE DISCLOSURE

Aluminum or aluminum alloy wire having a relatively high percentage of elongation and a relatively high fatigue resistance in addition to substantially high yield and tensile strengths is manufactured by a contnuous automatically controlled process involving the steps of cold working the wire by initially drawing the wire to a diameter near the final diameter and cleaning the wire in a solvent. Then the wire is strand annealed with a low frequency induction annealer with provisions for regulating the annealing temperature to precisely control the annealing by compensating for disturbing factors such as changes in line speed after which the wire is drawn in a specially controlled environment while controlling automatically the strand annealing and the heat loss between the strand annealing and the specially controlled environment to maintain the temperature of the wire being advanced into the specially controlled environment above the strain recrystallization temperature of the wire material. Then the wire is recleaned in a solvent after which insulation is extruded onto the wire, and stresses in the wire are distributed by reverse bending of the wire.

CROSS REFERENCE TO RELATED APPLICATIONS

This application is a continuing application of applicants' co-pending application Ser. No. 118,677, filed Feb. 25, 1971 now abandoned.

BACKGROUND OF THE INVENTION

(1) Field of the Invention

This invention relates to methods of and apparatus for processing non-ferrous metallic material and products produced thereby, and more particularly, relates to methods of and apparatus for processing metallic material selected from the group consisting of aluminum and aluminum alloys in a continuous fashion utilizing a series of equipment modules arranged in a controlled tandem system.

(2) Description of the Prior Art and Technical Considerations

Aluminum is a relatively good conductor of electricity and as such is supplementing copper in many electrical transmission applications. It is generally believed that the supply of aluminum is widely distributed and practically inexhaustible, whereas copper reserves are both concentrated and limited. Aluminum is, therefore, less expensive, more readily available and less subject to price fluctuations than copper.

Although the conductivity of aluminum per area of cross section is less than that of copper, its conductivity per unit weight is approximately twice that of copper. Since a slightly thicker insulation is required on aluminum conductor to meet the desired mutual capacitance characteristic in the final communications cable, and to compensate for the greater mass of material required for equivalent conductor sizes (aluminum being two gauge sizes larger than a copper equivalent), the plastic extruders must be larger than conventional insulating line extruders installed in other tandem wire drawing and insulating lines. Also, the additional insulative covering required necessitates more efficient cooling to prevent excessively long cooling lines.

Because aluminum conductor is gnerally weaker than the equivalent copper conductor, additional considerations must be given to a tandem line. For example, in cooling the successive sections of the insulated aluminum conductor, care must be taken to reduce the drag on the conductor because of increased susceptibility to wire break and/or stretch. The method of applying a cooling medium together with the flow thereof with respect to the direction of conductor travel must be reconciled with the effect on the line tension. Also, the additional insulation required necessitates more efficient cooling to prevent excessively long cooling lines. Additional precautions must be taken in cutover from a full reel to an empty reel or take-up, especially at the high line speeds, on the order of 5000 feet per minute, anticipated for use in processing aluminum conductor.

In the past, the use of commercially pure, electrical conductor grade aluminum for electrically conductive wires has bene inhibited by relatively poor mechanical properties. Difficulties in continuously manufacturing wire having desirable temper, that is to say, wire with a high elongation percentage and a high fatigue resistance in combination with sufficiently high yield and tensile strengths, encouraged manufacturers to try several approaches for producing aluminum wire with the desired mechanical properties. Substances such as silicon, copper and magnesium were added to the aluminum to produce inexpensive alloys. However, these alloys generally have relatively low conductivities and, therefore, are not usually desirable as copper. To effectively utilize aluminum for economically producing high quality electrical conductors, it appears necessary to use either E.C. grade aluminum which has a purity of at least 99.45 percent aluminum and a resultant conductivity of approximately 61 percent of IACS or to use those aluminum alloys such as aluminum-iron-magnesium alloys which do have relatively high conductivities.

Several approaches have been tried in attempts to provide relatively high conductivity aluminum or aluminum alloy wires with desirable mechanical properties. For example, aluminum wire (1) has been drawn in low temperature medium, (2) has been drawn from rods made from heated billets, and (3) has been batch annealed both before and after being drawn to its final diameter. However, none of these processes continuously produced aluminum wire having relatively high fatigue resistance and relatively high percentages of elongation in addition to high yield and tensile strengths.

Attempts to insulate batch annealed wire were unsuccessful. In paying off the wire, problems of low tensile strength and sticking of the wire prevented the insulation of more than a few hundred feet before a wire break would occur in the supply stand.

In the Waldman et al. U.S. Pat. 2,931,891, there is shown a device for preheating a bare conductor wire before the wire is advanced into an extruding die. Facilities are provided in the form of an autotransformer to permit an operator to regulate the autotransformer and thereby regulate the line voltage in a transformer. This permits feeding the wire into an extruder die at a temperature sufficient to remove moisture and to reduce the difference in temperature between the wire and the coating in the die to virtually zero, thereby permitting preheating properly at high speeds, say up to 2000 feet per minute.

The autotransformer interposes a variable resistance between line current and the transformer so that voltage can be controlled. The wire is moving within a speed range of 200 to 2000 feet per minute and is heated in the range of 200° F. to 400° F. depending on the coating to be applied. Since the current depends on the input voltage, the heat can be regulated by the autotransformer which regulates the line voltage into the transformer.

The Waldman et al. process is similar to that used on conventional copper annealers in which a stepped transformer is used in cooperation with another transformer to permit a trimming range within each step. However, facilities such as this may not provide a full range of control.

In the conventional copper annealer, the annealer is rendered effective when the line speed is up to about 80 percent of the final speed. This is acceptable on heavier gauge wire, but when using finer gauge copper wire, thermal shock in going from cold hand wire to soft hot wire in such a small amount of time may become intolerable. Therefore, these conventional facilities are acceptable after start-up, but during start-up could engender problems.

Other problems were encountered when using the conventional resistance type annealer and precluded the use thereof for continuous high speed production of aluminum conductor cable. Aluminum oxide accumulated on the conducting sheaves after short runs and to such an extent that arcing was intolerable. Conductivity between the sheaves was reduced causing wide variations in anneal. These and other problems are described in a talk, "Design and Manufacture of Plastic Insulated Aluminum Conductor Telephone Cable," presented by F. W. Horn and W. E. Bleinberger at the fifteen Annular Wire and Cable Symposium in Atlantic City, N.J. on Dec. 7-9, 1966. The substance of this talk was made the subject of two articles (1) Horn, F. W. and Bleinberger, W. F.: "Aluminum-Conductor Cable, An Alternative to Copper," pp. 314-319, *Bell Laboratories Record*, November 1967 and (2) Bleinberger and Horn: "Design and Manufacture of Plastic Insulated Aluminum Conductor Telephone Cable," pp. 1152-1158, *Wire and Wire Products*, July 1967.

It must be an object of this invention to provide methods of an apparatus for strand annealing of successive sections of a conductor together with tandem wire drawing and with automatic control of the annealer to compensate for system variables.

The prior art discloses facilities for strand annealing and for the control thereof. For example, in U.S. Pat. 2,459,507, issued in the name of one R. H. Denham, there is disclosed an induction heating method in which a tank of a suitable cooling liquid is maintained at a predetermined level with two sheaves, one totally submerged in the liquid and the other only partly submerged with facilities for passing wire on two loops around the sheaves. The sheaves have conical surfaces to bias the turns together to form a short circuited secondary, and the upper length of the secondary leading between the two sheaves consists of a single length of wire. A transformer is provided for inducing heating currents in the short circuited secondary with the wire run over the sheaves so that the single length moves from the partially submerged sheave to the other sheave during which movement the wire is heated and then cooled by the liquid in the tank.

The above-identified patent also provides for passing the wire in a single loop between the two sheaves with two turns around one sheave, with the turns arranged one above the other to provide electric contact therebetween. Each sheave is provided with a conical faced peripheral groove so that the two turns slide laterally toward and in engagement with a generally vertical face to maintain an electrically conducting relation whereby the wire constitutes a closed circuit secondary conductor or loop.

Because of the geometry of the groove, the forces between the wires and the walls of the groove are more critical than those between the adjacent wires in the groove. Under these conditions, it becomes difficult to insure an electrical contact between portions of the wires for a predetermined distance. The ability to control the electrical contact between the portions of the wires may be enhanced by designing the groove such that the forces between the wires become more critical than those between the wires and the walls of the groove.

The above-identified patent in an alternate embodiment shows a sheave having an extremely wide groove so that two superimposed wires of rectangular cross section may have the outgoing wire displaced laterally as it is drawn off the sheave.

In Denham, the string-up of the conductor is such that one run between the sheaves includes two conductors while the partially submerged leg includes one conductor. The current is thus halved in each conductor in the lower run with the result that the heating in the wire is reduced.

Additionally, the tapered sheave in Denham is similar to that of a wire drawing capstan, in that the wire tends to "walk." This is not entirely suitable for present needs where no "walking" of the wires is desired, but where, rather, a forced overlapping relationship is desirably maintained.

It is therefore an object of this invention to provide methods of and apparatus for annealing non-ferrous strand material in such a way as to obtain maximum heating efficiency with optimum predetermined electrical contact between portions of the strand material.

Methods of and apparatus for handling electrically conductive strand material are also disclosed in U.S. Pat. 2,993,114, issued in the names of T. T. Bunch and V. A. Rayburn and includes wrapping the portions of conductive strand material together to form a running overhand tie and maintaining the position of the running tie substantially stationary. Then, both portions of the conductive strand material are caused to move through the tie in the same direction to prevent excessive friction between and wearing of the conductive strand material. In this way, the two portions of conductive strand material roll relative to each other as they pass through the running tie and every point on each portion of the conductive strand material touches some point on the other portion at some time while passing through the tie. This causes uniform distribution of any current passing between the portions of the strand material as they contact each other while passing through the running tie. Moreover, the apparatus for establishing and maintaining electrical conductive strand material may be utilized to close a conductive loop of strand material which is maintained in an inductive relationship with the primary winding of a transformer to cause the strand material to be heated as a result of its resistance to the flow of current therein caused by a secondary voltage induced in the closed loop.

In the above identified patent, the transformer field induces current to flow in the successive portions of the strand forming the closed loop, which is closed electrically by the running tie. Induced voltage in successive portions of the continuously moving strand of electrically conductive material forming the loop, which loop is maintained in an inductive relationship with the primary coils of the transformer, causes a current flow which heats the strand as a result of the resistance of the strand material to the flow of current therein resulting from the induced voltage.

The problems encountered in tapered sheaves are discussed in an article, "Some New Concepts in Wire Handling" by Harry C. Kitselman, published in *Wire and Wire Products* in the October 1964 issue. Axial sliding is facilitated by a tapered drum surface which causes the axially slipping rounds to gradually loosen the grip thereof on the drum surface. It follows that a certain amount of circumferential slip must occur, which together with the axial slip, is abrasive to the sheave and the wire.

To overcome these problems, a V-groove sheave such as that described in U.S. Pat. 3,106,354, issued in the name of H. L. Kitselman, may be used, in which a conductor is wrapped around an arc of say 90° of the capstan, around an idler sheave and back into the groove under the wire already in it. During the arc of overlap, the entering wire under tension acts to press the under or exiting wire into firm and completely non-slip engagement with the sides of the sharp V-groove. The greater the tension in the outer arc of the wire, the greater traction obtained by the confined inner strand which results in the wire breaking before slipping.

The incorporation of a sheave such as that described in the Kitselman patent may be helpful in overcoming some of the problems in annealing. Specifically, the use of such a sheave may cause the wire to wire forces in the groove to become dominant over those of wire to groove wall which would permit of greater control over the portions of the wires in electrical engagement with each other. This feature of the overall development of facilities for producing acceptable aluminum conductor cable disclosed in a talk, "Aluminum Conductor Telephone Cable," presented by Warren E. Bleinberger at the Annual Wire Association Convention in St. Louis, Mo., Oct. 6–9, 1969. The substance of this talk was made the subject of an article, Bleinberger, W. E.: "Aluminum Conductor Cable a Reality," pp. 58–64, *Wire Journal*, April 1970.

In developing aluminum conductor production facilities, it was determined that tandem draw, anneal and draw facilities would be required to obtain a product having desired properties of yield and tensile strengths as well as the desired elongation. It should be apparent that such a combination of apparatus requires continuous control to obviate expensive extensive process checks and to reduce such checks to an inexpensive routine basis.

One type of control feature in a wire heating environment is shown in U.S. Pat. 3,117,209 in which a preheating device for electrical wire prior to the advancement thereof into an extruding die includes facilities for shutting off the current should the wire be stopped to prevent overheat. An inertia switch is coupled to a shaft on which a wheel is mounted. The switch shuts off the current to an inductive heating device whenever the wheel is rotated at less than a predetermined safe speed.

First generation prototype facilities, some of which have been used, disclosed publicly through talks and publications, have been developed which overcome the problems hereinbefore discussed. These include tandem multiple pass wire draw, inductive-resistance strand annealing and single pass wire draw. These facilities have been used to produce a limited amount of aluminum conductor cable for commercial use while continuing experimental work to sophisticate the apparatus, to develop controls for continuous automatic operation, and to produce finer gauge conductors.

SUMMARY OF THE INVENTION

It is an object of the invention to provide new and improved methods of and apparatus for processing non-ferrous wire and non-ferrous wire products produced thereby.

It is another object of this invention to provide methods of and apparatus for producing wire with a relatively high percentage of elongation and a relatively high fatigue resistance in addition to relatively high yield and tensile strengths and wire products produced thereby.

It is still another object of this invention to provide continuous methods of and apparatus for processing wire by regulating the speed at which the wire is drawn, regulating the annealing temperature and regulating the temperature at which the wire is subsequently drawn to improve the physical characteristics of the wire.

It is a further object of this invention to provide methods of and apparatus for drawing a conductor made from a non-ferrous metallic material, annealing the successive sections of the conductor and the further reducing the diameter of the successive sections of the conductor while automatically regulating the temperature of the annealing to control the temperature of the wire and to control the temperature of the wire prior to and subsequent to the further drawing while also regulating the temperature of a medium in which the wire is further drawn.

A still further object of the present invention is to provide methods of and apparatus for processing non-ferrous metallic wire wherein the wire is heated to anneal the wire and is then reduced in cross section while the wire is advanced through a liquid medium with the temperatures prior to and subsequent to being advanced through the liquid medium and the temperature of the liquid medium being controlled relative to the strain recrystallization temperature of the wire material to produce a wire having a relatively high percentage of elongation and relatively high fatigue resistance in addition to relatively high yield and tensile strengths.

Still another object of this invention is to provide methods of and apparatus for controlling the temperature of successive sections of a conductor being advanced into an extruder which applies an expanded insulative covering to the conductor.

Another object of this invention is to provide methods of and apparatus for the cooling of successive sections of a conductor insulated with a plastic material the conductor being made of a material selected from the group consisting of aluminum and aluminum alloys, in such a manner as to maintain the tension in the conductor as low as possible and to provide facilities for regulating the quench point.

A method for processing an indefinite length of non-ferrous metallic material, embodying certain principles of the present invention, may include the steps of advancing successive sections of an indefinite length of the metallic material, heating the advancing successive sections of the length of the metallic material to anneal the advancing successive sections of the material, and subsequently reducing the cross-sectional area of the advancing successive sections of the material while controlling the heating of the metallic material and the heat transferred from the advancing successive sections of the material to retain sufficient residual heat subsequent to the annealing step in the successive sections of the material and maintain the temperature of the successive section of the material being reduced in cross section at least relative to the strain recrystallization temperature of successive sections of the material being reduced to obtain an indefinite length of material having a relatively high percentage of elongation and a relatively high fatigue resistance in addition to substantially high yield and tensile strengths is produced.

Apparatus for processing an indefinite length of metallic material embodying certain principles of the present invention may include facilities for advancing successive sections of an indefinite length of non-ferrous metallic material, facilities for heating the advancing successive sections of the length of metallic material to anneal the advancing successive sections of the material, and facilities for subsequently reducing the cross-sectional area of the advancing successive sections of the material with control over the heating of the metallic material and the heat transferred from the advancing successive sections of the material to retain sufficient residual heat induced during the annealing in the successive sections of the material and maintain the temperature of the successive sections of the material being reduced in cross section at least relative to the strain recrystallization temperature of successive sections of the material being reduced to obtain an indefinite length of material having a relatively high percentage of elongation and a relatively high fatigue resistance in addition to substantially high yield and tensile strengths.

Aluminum wire products manufactured in accordance with methods and apparatus embodying certain principles of the present invention possess relatively high fatigue resistance in addition to substantially high yield and tensile strengths and a relatively high percentage of elongation.

Other objects and advantages of the present invention will be more readily understood from the following detailed description of specific methods of and apparatus for forming novel wire products embodying certain principles of the present invention, when read in conjunction with the attached drawings.

GENERAL DESCRIPTION OF THE APPARATUS

Figure 1:
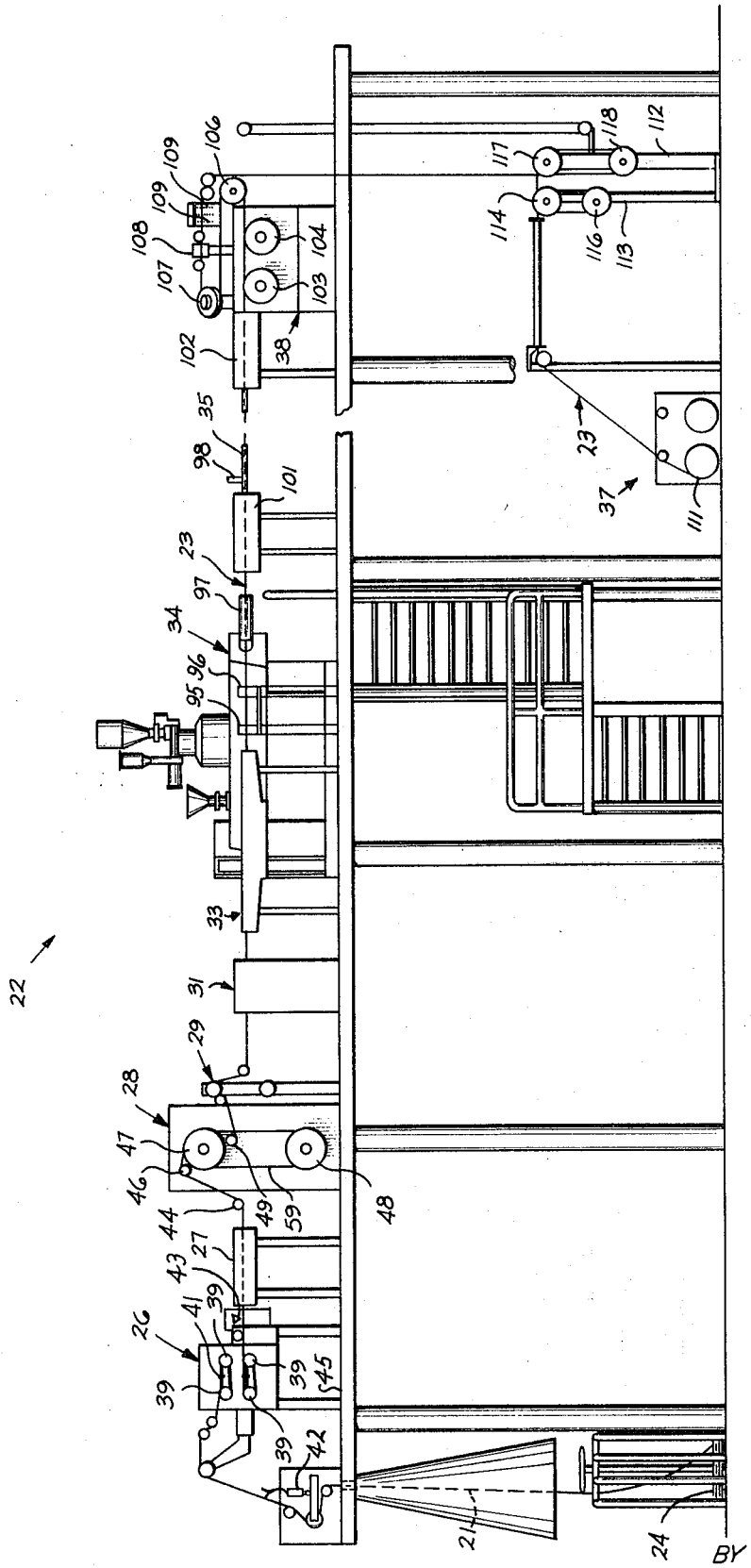
FIG. 1 is a side elevated view of apparatus for producing non-ferrous insulated conductors and, more particularly, for producing insulated aluminum and aluminum alloy conductors having improved phyical characteristics and employing certain principles of the present invention.

Referring now to FIG. 1, there is shown a wire 21 made from a non-ferrous metallic material and, more particularly, from a metallic material selected from the group consisting of aluminum and aluminum alloys with successive sections thereof being processed sequentially by the individual components of an aluminum wire production line or apparatus, designated generally by the numeral 22, to continuously produce an insulated conductor 23, the conductive portion thereof being a non-ferrous metallic material and, more particularly, a metallic material selected from the group consisting of aluminum and aluminum alloys.

For purposes of describing the methods and apparatus of this invention, the wire 21 and the insulated conductor 23 may be referred to hereinafter as the aluminum wire and the insulated aluminum conductor, respectively.

The aluminum wire 21, which is obtained, for example, by drawing down a EC–H12 temper rod to 8 or 10 gauge F-temper wire, is advanced from a supply 24 and passed through a conventional multi-die wire drawing machine, designated generally by the numeral 26, where the wire 21 undergoes several reductions in diameter and emerges in a highly stressed condition with a film of wire drawing compound (not shown) thereon. The wire 21 is then cleansed of the film in a first solvent bath 27, containing a solvent such as trichlorotrifluoroethane (Freon TF), and then strand annealed by an induction annealer, designated generally by the numeral 28. After being annealed, the wire 21 is passed through an accumulator, designated generally by the numeral 29, which compensates for any increase or decrease in the length of the wire between the annealer 28 and equipment downstream of the annealer. The wire 21 is drawn to a final desired diameter in a single pass wire drawing machine, designated generally by the numeral 31, in a circulating bath of a lubricating oil 32 such as Cindol 625 (FIG. 2) which may be maintained at a controlled temperature. Any of the oil 32 deposited on the wire by the wire drawing machine 31 is then removed by a second solvent bath 33 containing a solvent such as Freon-TF.

A conventional extruder, designated generally by the numeral 34, extrudes insulation (not shown) such as polyethylene or expanded insulation material such as polypropylene onto the wire 21 to form the insulated aluminum conductor 23. The insulated conductor 23 is then passed through water in a pipe 35 to control the solidification of the insulation. Subsequently, the successive sections of the insulated conductor 23 are advanced through a capacitance monitor 36 prior to the insulated conductor being taken up by a conventional high speed take-up device, designated generally by the numeral 37. A conventional pulling capstan, designated generally by the numeral 38, pulls the insulated conductor 23 through the extruder 34 and maintains tension on the portion of the wire 21 passing through the single-pass wire drawing machine 31.

The capacitance monitor 36 is connected in a closed-loop system to others of the equipment comprising the apparatus 22. For example, extruder zone temperatures as well as control over the location of the quench point of the water on the insulative covering are regulated by feedback signals from the capacitance monitor 36.

SPECIFIC DESCRIPTION OF THE APPARATUS

The aluminum used for both 12 and 20 gauge conductors is electrical conductor grades (E.C.) 99.45 percent pure aluminum with tensile strength between 13,000 and 17,000 p.s.i. (H–12 temper) and with a minimum volume conductivity of 61.5 percent IACS.

In producing the aluminum conductor 23, a ⅜ inch diameter rod is first drawn into eight gauge wire on a tandem rod-breakdown machine (not shown) and is collected in a continuous coiler. The rod-breakdown area includes a supply stand, a tandem breakdown machine, a continuous coiler and a lubrication-filtering system (none of which are shown). All of the equipment except the filtering system is in a totally enclosed area to isolate the bare aluminum rod from surrounding copper areas in the same production facility to eliminate the possible contamination of the aluminum. For further information regarding these facilities, reference may be made to an article, "Manufacturing Aluminum Conductor Telephone Cable," by Bleinberger, Tassi and Thomas, appearing in the October 1971 issue of *The Western Electric Engineer.*

The supply stand (not shown) is designed to constrain aluminum coils received from an aluminum supplier to permit the rod to be payed out from the center of the coil in a tangle-free condition. The rod is pulled out from the center convolutions of the coil through several guide rings (not shown) to form a diminishing spiral which pulls out each convolution with a minimum amount of abrasion prior to the rod being advanced into the wire drawing machine (not shown).

When the trailing end section of the aluminum rod of each coil is approached, an operator joins the trailing end section to the leading end of the next coil. The joining is accomplished with a commercial butt welder to effect a weld having very fine, equi-axed grain structure in the melt zone and a larger grain structure in the adjacent heat affected zones. With the exception of this welding equipment, all other aluminum wire joining is accomplished by cold-pressure welding.

The wire drawing equipment or rod-breakdown machine (not shown) employs a tandem capstan as opposed to a conventional stepped cone design in order to operate with a reduced amount of slip thereby avoiding damage to the aluminum. This is an important consideration since, unlike copper wire, flaws in the surface of aluminum rod tend to resist being drawn out.

Because E.C. grade aluminum wire can be easily marred and because large continuous supply coils 24—24 were preferred as pay-offs for the tandem wire draw, anneal and insulating lines, a continuous coiler (not shown) is used to take-up the 8 gauge aluminum wire from the rod breakdown machine (not shown). The size of reels which would have to be used together with the high spooling speeds would make tension control too critical and be a constant potential source of damage to the wire.

The coiler (not shown) minimizes the possibility of wire damage, particularly when V-groove sheaves, such as those shown in U.S. Pat. 3,106,354, issued Oct. 8, 1963 in the name of one H. L. Kitselman, are used as opposed to those with conventional cylindrical surfaces. Because of two sections of the wire 21 roll on and off each other, there is no slip and hence no surface damage to the wire. The greater the tension in the outer section of the wire, the greater the traction imparted to the confined inner section of the wire.

As the successive sections of the wire 21 are advanced out of engagement with the capstan, the wire is guided by a stripper tube into a shrouded wire carrier 40 (see FIG. 1).

The physical arrangement of the apparatus 22 is somewhat unconventional. Because of the greater mass of polyethylene insulation to be extruded on the larger diameter aluminum conductors, longer cooling tubes or troughs were required on initially installed equipment to adequately cool the insulation. Of course, an unacceptable alternative would be to reduce line speed. In order to conserve floor space, a two level configuration for the tandem wire draw and insulating line was employed.

Successive sections of 8 gauge aluminum wire 21 from supply coils are advanced up through a platform 45 of a second level to the overhead portion of the apparatus 22. Provisions are made to avoid tangles in the wire 21 being advanced upwardly. Should a tangle occur, a limit switch 42 activates a solenoid air operated shear 43 to sever the wire 21 at the exit or downstream end of the multi-pass wire draw machine 26 to prevent loss of string-up therein.

Figure 2:
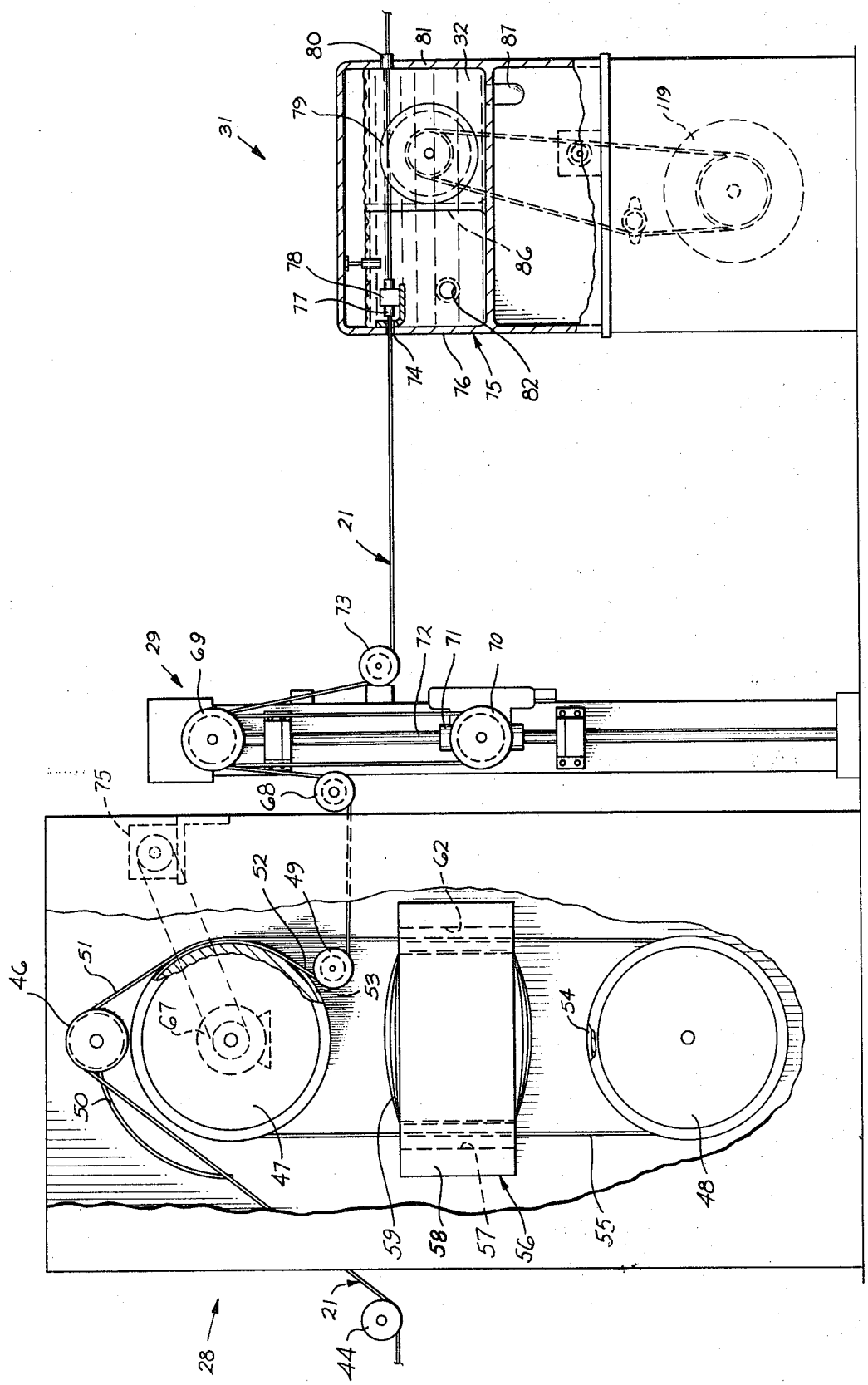
FIG. 2 is an enlarged side elevated view of an annealer, a combined accumulator and synchronizing control and wire drawing section of the apparatus of FIG. 1 with portions thereof broken away for purposes of clarity.
Figure 3:
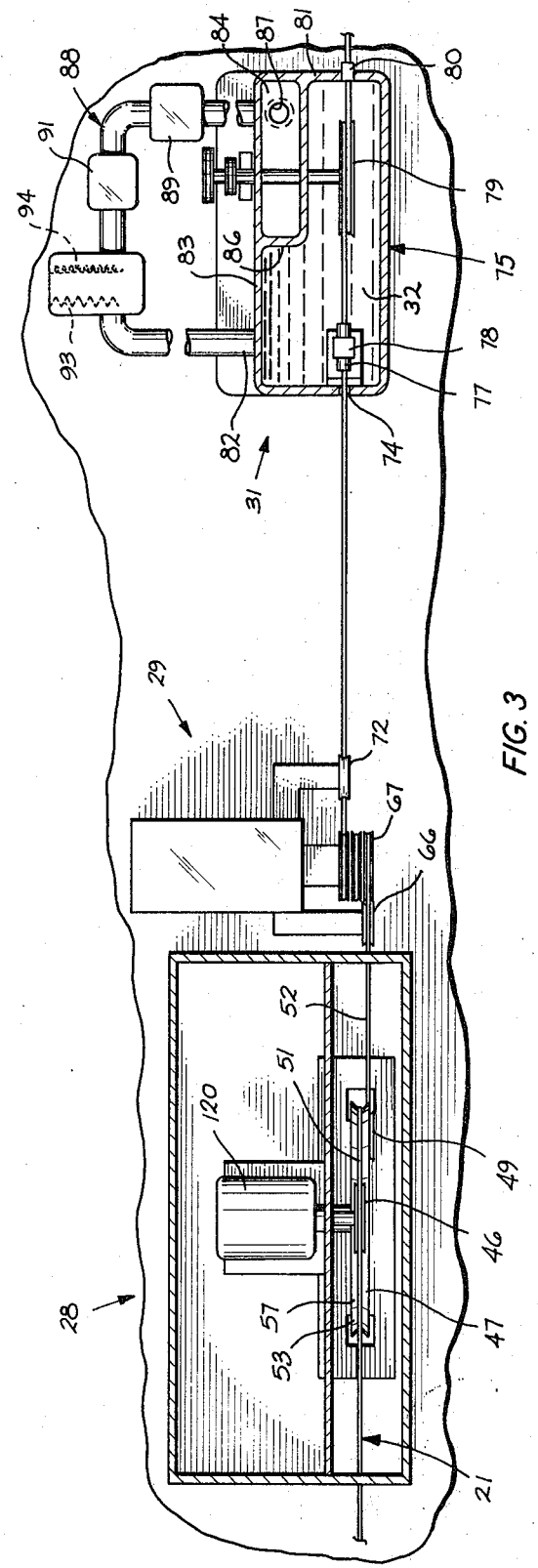
FIG. 3 is a top plan view of the apparatus of FIG. 2 with portions thereof broken away for purposes of clarity.

Prior to the annealing of the successive sections of the wire 21 and subsequent to drawing the wire down to the final diameter thereof with the equipment illustrated in detail in FIGS. 2 and 3, the wire is initially reduced in cross section by the conventional multi-pass wire drawing machine 26. As seen in FIG. 1, the wire 21 is pulled from the supply source 24 by a plurality of capstans 39—39 which also pull the wire through a plurality of wire drawing dies 41—41. The dies 41—41 have apertures (not shown) with progressively decreasing internal diameters which reduce the diameter of the wire 21 to a diameter close to the final diameter. For example, the dies 41—41 might progressively reduce the diameter of the wire 21 from 8 to 10 AWG to 19 AWG.

Ordinarily the portions of the wire 21 entering the multi-pass wire drawing machine 26 are hard drawn. In any case, the portions of the wire 21 leaving the multi-pass wire drawing machine 26 are hard drawn or highly stressed due to repeated passes through the dies 41—41 which work harden successive sections of the wire. If the wire 21 being processed is pure aluminum, then the tensile strength of the portions of the wire emerging from the multi-pass machine will be approximately 27,000 p.s.i., the yield strength will be approximately 24,000 p.s.i., and the percent elongation will be approximately 1.5 percent.

The cooling and lubricating oil used in the multiple pass wire drawing machine 26 is similar to that used in the rod breakdown machine (not shown) except that it has fewer additives and is less viscous. The oil is returned by gravity from both the multiple pass wire drawing machine 26 and the single pass wire drawing machine 31 to storage tanks (not shown) and continuously filtered and recirculated. While in the storage tanks, the oil may be heated. Moreover, the oil is pumped through heat exchangers (not shown) to cool the oil to approximately 120° F. and then conveyed back to the wire drawing machines.

After being hard drawn, the wire 21 has a relatively low percentage of elongation and, therefore, would not withstand the bending stresses induced when the wire is flexed during subsequent operations, such as stranding the wire into a cable or bending the wire several times when installing the cable. Since the wire 21 is highly stressed, it must be annealed to relieve the stresses. Before annealing the wire 21, a film of wire drawing compound remaining on the wire from the multi-pass wire drawing operation is preferably removed to prevent smoking and carbonization of the compound on the wire during the annealing process.

Upon leaving the multi-pass wire drawing machine 26, the wire 21 enters the first solvent system or bath 27 where any of the wire drawing compound adhering thereto is removed by a solvent such as trichlorotrifluoroethane (Freon-TF). An ultrasonic exciter (not shown) may be positioned in the solvent bath 27 to vibrate the wire 21 and thereby help dislodge particles of the wire drawing compound which might be adhered thereto.

To reduce noxious vapors which would otherwise result from the low boiling point of the solvent and to recover the relatively expensive spent solvent, the cleaning system 27 is a closed loop recirculating system. The system 27 includes two cleaning tanks maintained under a slight negative pressure, a heat exchanger (not shown), a still (not shown) and a carbon absorption system.

The Freon-TF is pumped from the supply to the bath 27 in the insulating lines with the Freon-TF being returned by gravity from the cleaning tanks, through the heat exchanger (not shown) where the temperature thereof is raised slightly and then to the still (not shown). The distillation cycle is controlled by the level of the Freon-TF in the supply tank (not shown). The distilled Freon-TF flows out by gravity from the still (not shown), through an economizer where the temperature is lowered slightly and then into the supply tank, with the Freon-TF constantly circulated between the supply tank (not shown) and a chiller (not shown). Collected vapors are directed over and adsorbed by a carbon bed whereupon steam is passed over the bed to strip the Freon-TF which is condensed, distilled and returned to the system.

After being cleaned, the successive sections of the wire 21 are advanced into the annealer 28 where the wire is annealed by an inductive-resistance heating process. There is a definite advantage to hard drawing the wire 21 prior to annealing the wire in that the highly stressed long-grain crystalline structure of a hard drawn wire responds more readily to annealing heat than the flexible crystalline structure of a partially hardened wire. The strand annealer 28 can, therefore, fully anneal successive portions of the work hardened wire 21 passing through the annealer at a faster rate.

Referring now to FIGS. 2 and 3 where the annealer 28 is illustrated in detail, the wire 21 is shown being directed under a stationary rotatably guiding sheave 44 and over an adjustable moveable rotatably non-conductive guiding sheave 46 before being looped around a pair of non-conducting sheaves 47 and 48 and exiting by passing beneath a sheave 49. The adjustable sheave 48 is mounted in an arcuate slot 50 which enables the operator of the apparatus 22 (FIG. 1) to adjust the amount of slippage of the wire 51 relative to the sheave 47 by adjusting the position of the sheave 46 in the slot so as to change the angle at which the wire approaches the sheave 47.

Successive incoming portions 51—51 of the wire 21 are passed continuously over successive exiting portions 52—52 of the wire which are directed around and beneath the sheave 47. The peripheries of the sheaves 47 and 48 are each formed with V-shaped grooves 53 and 54, respectively, which are coated with insulating material such as chromium oxide. The groove 53 in the top sheave 47 helps insure that the incoming portion 51 of the wire 21 will overlay the exiting portion 52 over a considerable length of the exiting portion so as to obtain optimum contact resistance between continuous successive sections of the wire and to insure sufficient frictional engagement between the sections of the wire and the sheave 47.

By changing the position of the sheave 46 in the slot 50, and thereby changing the angle at which the wire 21 approaches the sheave 47, the length of the overlap between the incoming portion 51 of the wire and exiting portion 52 of the wire can be adjusted to maintain the proper frictional force between the portions of the wire and the sheave. This adjustment is made so that the wire 51 will slip slightly with respect to the sheave, thereby eliminating a tendency of a loop portion 59 between the incoming and exiting portions 51 and 52 of the wire to become slack and disengage itself from the bottom sheave 48 due to elongation caused by heat induced in the wire by the annealer 28.

The geometry of the groove 53 in the sheave 47 is critical in determining performance of the annealer 28. The geometry of the groove 53 must be such as to provide: (1) stable wire positions with respect to the incoming portions 51 and the exiting portions 52 and with respect to the sheave 47, (2) a stable wire-to-wire contact line to prevent vibrations which cause sparking, (3) sufficient wire-to-wire force along a contact line to break through any oxide film on the surfaces and provide adequate electrical engagement between the wires, (4) sufficient forces on the bottom or "hot" wire portion to provide non-slip contact with the sheave 47 when the bottom portion of the wire has zero tensile force imparted thereto, (5) sufficiently low forces on the bottom wire portion to prevent deformation thereof when heated to a temperature of 650° F., (6) sufficiently low forces on the top or incoming portion of the wire to permit slip thereof to accommodate the differences in wire speed caused by elongation due to temperature differences between the upper and lower portions of the wire 21 and/or the differences in the actual radii of the upper and lower wire portions when at the same temperature. It must be understood that all of the above-mentioned forces result from the tension in the upper portion of the wire 21. The construction of the sheave 47 and the string-up permits the annealer to be run with zero tension in the exiting or lower portion 52. Of course, the length of engagement between the incoming and exiting portions affect the tension in the incoming portion of the wire 21.

The annealer 28 is equipped with a transformer, designated generally by the numeral 56, which heats the loop portion 55 of the wire 21 as successive portions of the wire pass through openings 57—57 in an iron core 58 of the transformer. The transformer 56 may be a 60 Hz. transformer when using the apparatus 22 to produce aluminum or aluminum alloy conductors 23—23. However, should the apparatus be used periodically to produce copper conductors, a higher frequency transformer, on the order of 400 Hz., must be provided. Moreover, provision for convertibility should include facilities for annealing in an inert atmosphere.

The core 58 of the transformer 56 is energized by a winding 59 which induces a fluctuating magnetic field in the core. The fluctuating magnetic field, in turn, induces a current in the successive portions of the wire 21 in the loop portion 55 of the wire, which causes the wire to increase rapidly in temperature because of the natural resistance of the wire. Since the entering portion 51 and exiting portion 52 of the wire 21 overlap and are continuous, the current is retained within the loop portion 55 and for all practical purposes does not stray to other portions of the wire 21. Furthermore, since the loop portion 55 is heated by an induced current, the entire cross section of the wire 21 is heated simultaneously, as opposed to being heated by an external source where the heat has to flow into the interior of the wire from the outer surface of the wire.

If current were allowed to pass between the sheaves 47 and 48 and the wire 21, arcing which would pit the wire would take place due to an aluminum oxide build-up. This would create points of high and uncertain resistance between the sheaves and the wire. In order to prevent arcing, current is prevented from passing between the sheaves 47 and 48 to the wire 21 by the V-shaped grooves 53 and 54 of the sheaves 47 and 48 which are coated with nonconducting coatings of a material such as chromium oxide. As mentioned before, an electric circuit is established in the loop 55 due to the overlap of the entering and exiting portions 51 and 52, respectively, of the wire 21. Since the entering and exiting portions 51 and 52 are free of relatively large deposits of aluminum oxide, arcing will not occur between the portions and the wire 21 will not be pitted.

Provisions are also made for controlling automatically the annealer by compensating for changes in line speed. Once start-up has occurred and a full reel of scrap wire 21 has been taken up and tested, controls (not shown) for the annealer 28 are set and thereafter the correlation of annealer voltage and line speed is continuously automatically established. This control feature assumes a critical role in tandemized annealing and subsequent wire draw as will be hereinafter disclosed.

The voltage is proportional to the square root of the line speed, is independent of the wire diameter, and dependent on the desired temperature in the wire. Theoretically, then, changing the diameter of the successive sections of the wire 21 in the annealer does not require any drastic change in the annealer voltage. However, it has been found experimentally that minor variations in voltage are required if the gauge of the wire 21 or the commercial supplier of the rod is changed.

Facilities for controlling automatically the annealer voltage so as to not over-anneal or under-anneal may include provisions (not shown) for measuring the temperature of the wire with feedback to the annealer 28. In the presently used aluminum conductor production facilities 22, the control is achieved through a speed tracking device designated generally by the numeral 60 (see FIG. 6). The speed tracking device 60 includes solid state control on the primary coil 59 of the annealer transformer 56 and consists of two silicon-controlled rectifiers 61—61 arranged in "anti-parallel," i.e., in parallel, but each conducting in opposite directions.

Figure 6:
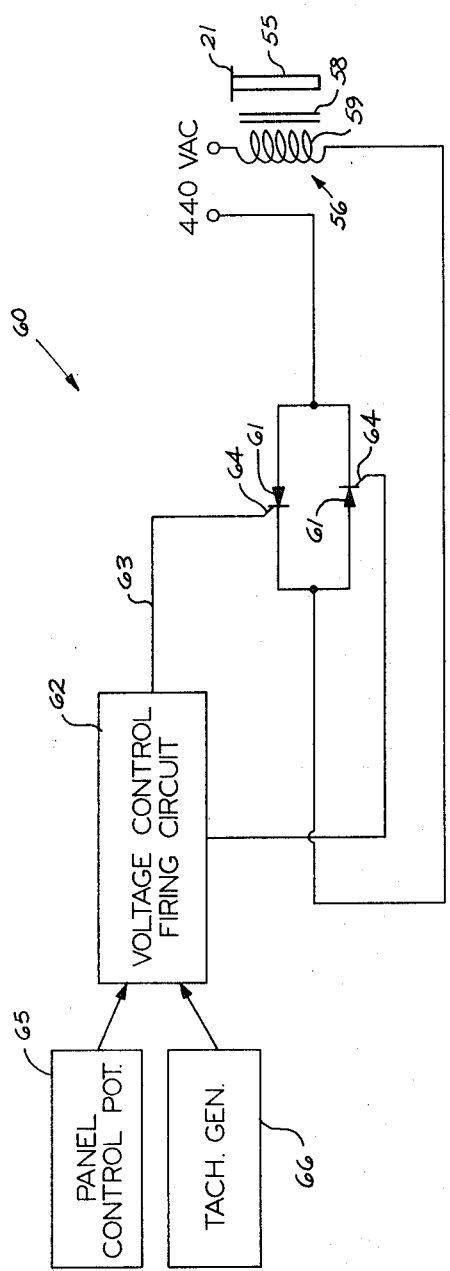
FIG. 6 is a schematic view of facilities which are used to control continuously the heating of the wire.
Figure 7:
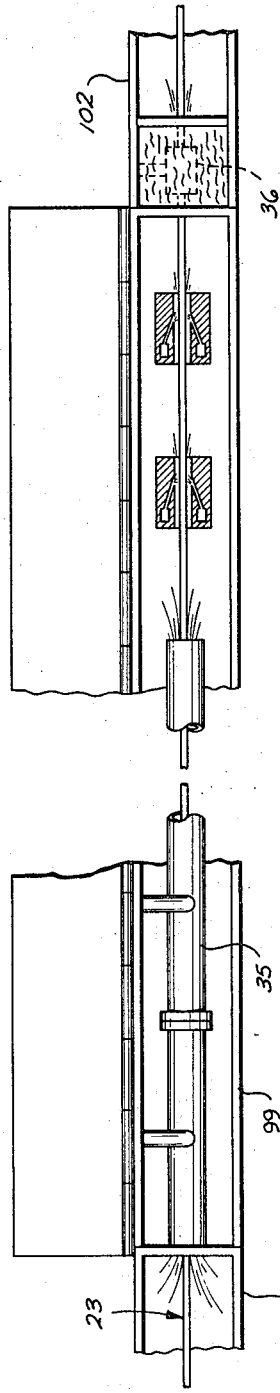
FIG. 7 is an enlarged detail view of a cooling arrangement which may be used to practice the methods of this invention to adequately cool the relatively increased amount of insulation extruded on aluminum and aluminum alloy conductors and to reduce the tension thereon.

The speed tracking device 60 is essentially a phase angle control circuit in which during every half cycle, one silicon controlled rectifier and then the second one are turned on in alternate order, the time required for turn-on being determinative of the power and voltage supplied to the annealer 28. The speed tracking device 60 includes a voltage control and firing circuit 62 which, as shown in FIG. 6, is connected along lines 63—63 to gates 64—64 of the silicon controlled rectifiers 61—61. The triggering of the silicon controlled rectifiers 61—61 is controlled by a panel control potentiometer 65 and a line speed sensing tachometer 66. The tachometer 66 is belted from an annealer drive motor 67 so that the tachometer voltage output is proportional to the square root of the line speed.

The control circuit is normally set at approximately 80 percent of the maximum voltage corresponding to the maximum expected line speed. This is effect gives +20—100 percent adjustment on the actual operating point on the control panel, and gives the capability of going higher for a limited increment or lower. The tachometer 66 is designed to adjust automatically the voltage in accordance with the square root relationship mentioned hereinbefore. The shaping circuit, between the tachometer output and the triggering circuit 62 adjusts the voltage. Another panel (not shown) controls all adjustments from the maximum voltage at any given speed down to zero voltage.

The speed tracking device 60 is set for a given line speed and a given annealer operating speed. The controls ordinarily compensate for speed variations that take place under normal operating conditions. The speed tracking device 60 will also increase and decrease the voltage as required for intentional speed changes such as starting and stopping the apparatus 22.

Operating layouts with approximate operating voltage for each wire gauge and line speed that may be anticipated are specified. When starting the line, the operator is required to make an elongation check of the wire 21 on the first reel taken up to ascertain whether the annealer 28 operation is within the specified limits. If any correction is required, subsequent reels are checked until such time that the desired operating condition is reached. As long as operating conditions are not changed, checks are carried out on a routine sampling basis. If operating conditions are changed, such as line speed, or if a line is stopped or restarted for any reason, the operator is required to make a sample of the first reel.

When processing aluminum wire at, for example, approximately 2000 feet per minute, with the loop 55 of approximately 12.5 feet, it is necessary for the current induced in the wire 21 by the transformer 56 to heat the wire to a temperature ranging between 630° F. and 680° F., with a nominal of approximately 650° F., in order to anneal the wire within the short time of travel thereof in the annealer 28, and thereby relieve the stresses introduced by the multi-die wire drawing machine 26. The annealed wire 21, when made of E.C. grade aluminum, will have a tensile strength of approximately 11,000 p.s.i., a yield strength of approximately 6,000 p.s.i. and a percentage elongation of approximately 25 percent. In other words, the wire 21 will be quite soft and ductile. Due to the low yield strength, the wire 21 exiting from the annealer 28 would tend to stretch beyond the elastic limit thereof during the aforementioned subsequent handling operations. The wire 21, when in this state, is mechanically weak and, therefore, unacceptable as an electrical conductor for communications and other commercial applications.

In order to strengthen the annealed wire, the successive sections of the wire must be work-hardened. In order to accomplish the work-hardening, the wire 21 is advanced from the annealer 28 through the accumulator 29 to the single-pass wire drawing machine 31. The accumulator 29 is conventional in design and serves to compensate for fluctuation in the linear velocity of the successive portions of the wire 21 exiting from the annealer 28 and the linear velocity of successive portions of the wire 21 entering the single-pass wire drawing machine 31.

As best illustrated in FIG. 2, the wire 21 enters the accumulator 29 by passing under a sheave 68. The wire 21 then passes over one of three stationary sheaves 69—69 (see FIG. 3) and loops around one of a pair of movable sheaves 70—70 which is mounted on a sleeve 71 that reciprocates on a rod 72 in response to changes in tension in the wire 21. The successive sections of the wire 21 are then passed over a second one of the movable sheaves 70—70, and over the third one of the stationary sheaves 69—69 and under a stationary sheave 73 before being advanced to the single-pass wire drawing machine 31.

The single-pass wire drawing machine 31 is shown in detail in FIGS. 2 and 3. Successive sections of the annealed wire 21, while still hot from the annealing process, and at a temperature above the recrystallization temperature, are moved through a seal 74 mounted in a wall 76 of a tank, designated generally by the numeral 75. After traveling a short distance, the wire 21 enters a die 77 which may be positioned within an ultrasonic exciter 78. By vibrating the wire and agitating the drawing medium during draw, the wire drawing force may be decreased and the surface finish of the wire may be improved. The die 77 reduces the diameter of the wire 21 an amount which may be, for example, approximately 1 AWG gauge.

It should be observed that the batch type of annealing followed by "cool-down" of the aluminum wire 21 and subsequent single-pass wire draw produced wire which did not possess optimum properties. Experiments showed that only when the wire 21 was "drawn hot" did the wire possess improved properties, i.e., ten percent elongation while maintaining desired properties of yield and tensile strengths.

A conventional tapered ceramic or steel capstan 79, positioned within the tank 75, pulls the wire 21 from the exit side of the die 77 as the wire advanced through the tank and exits through a wiper die 80 positioned in a wall 81 of the tank which finishes the surface of the wire resulting in a reduction of the diameter of the wire by about one mil and helps remove most of the oil 32 which might adhere thereto. In addition to pulling successive sections of the wire 21 through the die 77, the capstan 79 serves as a heat sink to transfer residual heat from the wire to the circulating oil 32.

The tank 75 is filled partially with the lubricating oil 32 which is circulated through an inlet 82 in a side wall 83 (see FIG. 3) of the tank. The lubricating oil 32 is maintained at a proper level in the tank 75 by an overflow compartment 84 (see FIG. 3) which has a wall 86 that extends slightly higher than the path of the wire 21. As the oil 32 enters the tank 75, the oil rises in the tank and continuously flows over the wall 86 and into the compartment 84 where it exits through a drain 87 (see FIG. 3) positioned in the bottom of the compartment. The oil 32 then circulates through a pipe line 88 as schematically illustrated in FIG. 3, is clarified by a central filtration system (not shown) and is then pumped back into the tank 73 through the inlet 82.

The temperature of the circulating oil 32 in the central system may be controlled by activating a heater 93 (see FIG. 3) at a central supply (not shown) if the oil becomes too cool or by activating a cooler 94 if the oil becomes too hot. A uniform oil temperature may be maintained and the oil 32 circulated continuously through the tank 73 to achieve and maintain an equilibrium temperature condition. The rapidly rotating capstan 79 increases turbulence in the circulating oil 32, which, in turn, increases heat transfer between the wire 21 and the oil, and also tends to maintain oil of a substantially uniform temperature in close proximity to the die 77 through which the wire passes.

When drawing aluminum wire through a single AWG gauge reduction of about 20 percent, it has been found that a conditioning of the oil to about 120° F. at the central supply system (not shown) produces wire having very desirable characteristics. Experiments have shown that the wire 21 emerges from the annealer 28 and enters the single-pass wire drawing machine 31 at a temperature of approximately 600° F. and emerges from the single-pass wire drawing machine at a temperature between 250° F. and 330° F. While in the single-pass wire drawing machine 31, the temperature of the wire 21 drops approximately 300° F. due to heat transfer from the wire to the oil 32 and to the capstan 79 around which the successive sections of the wire are wrapped. The temperature of the oil 32 in the tank 75 after start-up due to the heat transfer from the wire 21 becomes about 160° F.

Experiments were run on a prototype line in which the oil 32 in the single pass wire drawing machine 31 was heated to a temperature in the range of 250° F. The experiments showed that the use of the heater 93 may not be necessary. In fact, the cooling coils of the heat exchanger (not shown) in the central wire drawing compound system may be used the majority of the time after start-up under actual operating conditions in subsequently installed production lines. During start-up, it may be necessary to heat the oil 32 at the central supply (not shown).

Experimentation on the prototype line led to conclusions as to why the oil 32 need only be heated to a 100–130° F. range rather than the 200–250° F. range that tests indicate is desried for optimum hot drawing. After start-up, the annealed wire 21 is at a temperature which is sufficiently high so as to transfer heat to the oil 32 to raise the temperature of the oil. Although the oil 32 is part of a circulating central system, as opposed to a closed loop system particular to the single pass wire draw machine 31, the transfer of heat is great enough to raise significantly the temperature of the oil over that of the system supply temperature. The single-pass wire drawing machine 31 is so close physically to the annealer 28 that very little heat is lost in advancing the successive sections of the wire 21 from the annealer to the single pass wire drawing machine. Also, the capstan 79 acts as a heat sink and effectively transfers some of the heat absorbed from the sections of the wire wrapped therearound to the coil 32.

It has been determined that what is important is that continuous automatic control must be exercised over the annealer 28 and the heat loss in the successive sections of the wire 21 between the annealer and the single pass wire drawing machine 31. Control must be exercised to insure that the temperature of the wire being advanced into the single pass wire drawing machine is substantially equal to the temperature at anneal and generally greater than the strain recrystallization temperature of the wire material. Control must also be exercised over the oil bath 32 and the travel of the wire 21 therethrough to insure that the temperature of the wire exiting therefrom is in the range of approximately 250° F. to 330° F.

Of course, the speed tracking unit 60 hereinbefore described controls the temperature of the annealed wire 21. This, coupled with predetermined spacing of the annealer 28 and the single pass wire drawing machine 31 and with the ability to control the temperature of the oil bath 32 at any time, including start-up of the operation, permits the requisite control over the temperature of the wire 21.

The wire 21 emerges from the single-pass wire drawing machine 31 in a partially hardened state. If the wire 21 is E.C. grade aluminum, then the yield strength of the wire will be increased by the single-pass wire drawing machine 31 from 6,000 p.s.i. to approximately 13,000 p.s.i., the tensile strength will be increased from 11,000 p.s.i. to approximately 15,000 p.s.i. and the percentage elongation will be reduced from approximately 25 to approximately 10.

By reducing the temperature of the wire 21 subsequent to passing through the wire drawing machine 31, an additional advantage is achieved in that the wire 21 is cooled so as to provide the desired degree of adhesion between the wire and the insulation (not shown) extruded thereon by the extruder 34. If the wire 21 is too cool, the wire acts as a heat sink and the plastic at the wire surface freezes before the desired degree of adhesion is achieved; if too hot, the plastic flows into microscopic imperfections in the wire with resulting overadhesions.

This, of course, becomes a much more critical consideration when the aluminum 21 is to be covered with an expanded insulation. In using expanded insulation with the aim of reducing the amount of plastic material, a blowing agent is introduced into the extrudate. The blowing agent develops nucleating centers which upon egress from the extruder 34 with accompanying subjection to atmospheric pressure and temperature expand to produce an insulative covering in the range of 30–70 percent air. Should the bare wire 21 be too hot, the bubbles become too large and a non-homogeneous insulative covering results; if too cool, then underexpansion occurs and the insulative covering becomes layered with an interior layer of unexpanded insulation.

Therefore, the temperature of the wire 21 which is advanced out of the wire drawing machine 31 and into the extruder 34 must be more precisely controlled. Depending on the material of the wire 21 and other upstream line conditions, an intermediate preheat or precool may be required between the single pass wire drawing machine 31 and the extruder 34. For these purposes, heating or cooling facilities 95 may be interposed between the wire drawing machine 31 and the extruder 34 on either side of the tank 33.

For aluminum and aluminum alloys, it may be necessary to cool the wire 21 entering the extruder 34. Commerically available equipment such as, for example, electrostatic cooling equipment, may be used for this purpose.

After being reduced to the final diameter, the wire 21 is cleansed of the oil 32 and further cooled in a bath 33 of a solvent such as Freon-TF. Insulation is then extruded onto the cleansed and cooled wire 21 by an extruder head 97 to form the insulated conductor 23. When using expanded insulation, the extruder temperatures must be more closely controlled, say to within ±5° F., as contrasted with extruder temperature ranges of ±20° F. for conventional insulation.

The insulated conductor 23 is then passed through the pipe 35 and immersed in water having a controlled temperature being moved through the pipe to cool and to solidify the insulation. The water enters the pipe 35 through an inlet 98 and flows out of the ends of the pipe into drainage tanks 101 and 102. When producing 17 gauge aluminum conductor, the flow of water in the pipe 35 is counter to that of the direction of travel of the wire 21; for 20 gauge, in the same direction. During experimentation on the prototype line, a counter-flow system had been used for 17 gauge trials.

Because of the wire 21 being made of aluminum, with the accompanying reduced tensile strength over that of copper, additional precautions may have to be taken to avoid undue tension in the wire, especially at the anticipated high line speeds. The mere flooding of the pipe 35 with at least part of the water being moved in a direction counter to that of the advance of the wire increases the drag on the wire and the possibility of breaks.

To overcome this, it may be deemed necessary to use a strand treatment method such as that described in an application filed in the name of one H. L. Woellner on Dec. 28, 1970, Ser. No. 101,713 now U.S. Pat. 3,740,862, in which high velocity jets of water are directed in a direction downstream of the successive sections of the insulated aluminum conductor to reduce the drag on the conductor.

Alternately, the pipe 35 may be flooded with a high velocity discharge flowing in the direction of the movement of the conductor 23. (Another approach would be to use a plurality of air or water applicator rings spaced longitudinally along the longitudinal axis of a cooling trough 99 downstream of the extruder 34.) This flooding may be especially desirable when using expanded insulation. Then, the distance between the extruder head 97 and the cooling trough 99 as well as the method of applying the water become critical. For example, a thin uniformly distributed curtain of water must be applied to the entering sections of the insulated conductor 23. If a spray were to be used, the cross-sectional shape of the insulated conductor 23 may become elliptical rather than circular.

A capacitance monitor 101, for measuring the conductor 23, is positioned downstream of the extruder 34 and in the cooling trough 99. The capacitance monitor 101 may be of a conventional commercially available type and is constructed in a closed loop system to control the extruder temperatures as well as the initial quench point of the insulative covering.

The conventional water-cooled pulling capstan 38 imparts pulling forces to the insulated conductor 23 in order to maintain adequate tension on the insulated conductor so that the wire 21 will remain tightly wrapped around the capstan 79 in the single-pass wire drawing machine 31 and will remain taut while being advanced through the bath 33, extruder 34 and cooling pipe 35. A pair of multiple-grooved sheaves 103 and 104, positioned in tandem on the pulling capstan 38 and driven by an electric motor (not shown), serve to pull and advance the insulated conductor 23 which is looped therearound. After looping around the sheaves 103 and 104, the conductor 23 passes around a sheave 106 and is directed to a conventional barewire detector 107 which detects any areas of the wire 21 which are not covered by insulation by making electrical contact with exposed portions of the wire. Other conventional testing instruments, such as a diameter gauge 108 for measuring the diameter of the insulated wire 23 and a series of high-potential beaded electrodes 109–109 for detecting "pin-hole" defects in the insulation, can be provided to further test the insulated conductor 23 before the insulated conductor is taken up by one of a pair of axially aligned, motor-driven reels 111—111 (only one of which is shown) on the conventional high-speed take-up device 37.

Two accumulators, designated generally by the numerals 112 and 113, are disposed between the pulling capstan 38 and the high-speed take-up device 37. The insulated conductor 23 is looped several times around multigrooved sheaves 114 and 116 of the accumulator 113 and a fewer number of times, perhaps two, around sheaves 117 and 118 of the accumulator 112. The accumulator 112 acts as a shock absorber for the insulated conductor 23 and responds rapidly to slight and rapid variation in the length of the insulated conductor in the system. This variation may result from differences in the speed in which successive portions of the insulated conductor are fed toward the reel 111 by capstan 38 and the speed that the conductor is being taken up by the reel 111. The accumulator 113 is a speed control device for varying the angular velocity of the reels 111—111 and supplies and stores lengths of successive sections of the conductor 23 being fed to the take-up device 37 particularly when the taking up of the conductor is switched from a full one of the reels 111—111 to an empty one of the reels 111—111.

The accumulators 112 and 113 also serve the additional function of redistributing or equalizing stresses in the insulated conductor 23 by bending successive sections of the wire 21 as these sections pass over the sheaves 114, 116, 117 and 118. Since the successive sections of the conductors 23—23 tend to twist as they pass over the sheaves 114, 116, 117 and 118, the successive sections will be bent in numerous directions, thereby distributing the stresses more evenly throughout the successive sections of the wire 21.

In order to coordinate the rates at which the various components of the apparatus 22 take in and feed out successive portions of the wire 21 and the insulated conductor 23, a conventional control system may be utilized to match the output speeds of motors, such as drive motors 119 and 120 (FIGS. 2 and 3) of the single-pass wire drawing machine 31 and the annealer 28, respectively.

Because the insulated aluminum conductor 23 is generally weaker than the equivalent copper conductor, the problem of transferring take-up from a full reel to an empty reel at high speeds becomes very critical, particularly with the finer gauges. The cutover in a take-up device of the type hereinbefore described imparts undue amount of shock to the insulated conductor. In order to overcome this problem, a modified take-up apparatus 122 having the reels arranged as shown in Pat. No. 2,674,414, issued to W. T. Hicks and D. V. Waters, is used. The axes of the reels are parallel to the direction of wire travel rather than perpendicular thereto and a minimal velocity change at cutover is of assistance in providing a less shock to the weaker aluminum conductors 23—23.

It has also been found that for the finer gauge aluminum conductor 23, it is necessary to use a material which is an alloy of aluminum and iron. The apparatus 22 may then be used to process an aluminum conductor 23 from new material of this composition with only minor changes in the process control.

Example A.—20 Gauge E.C. Grade Aluminum Wire

Figure 4:
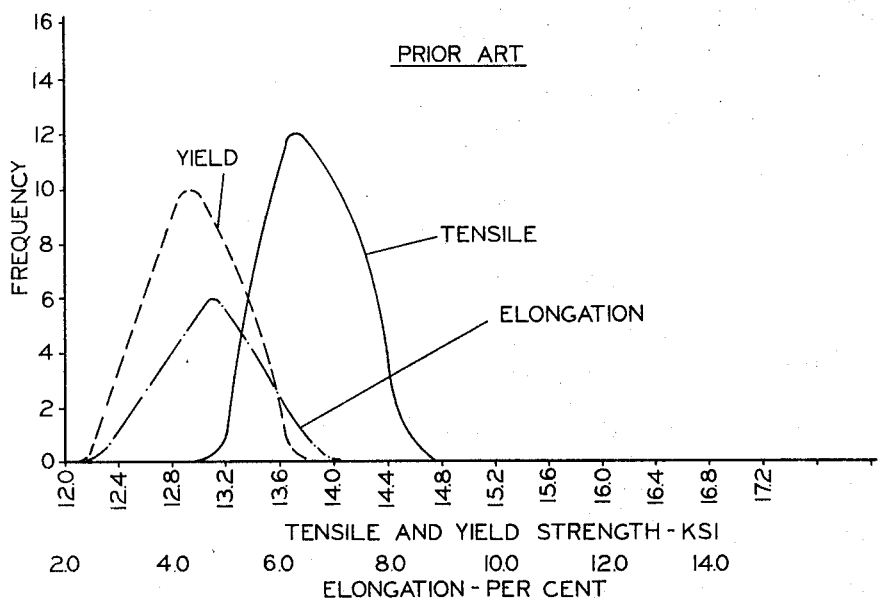
FIG. 4 is a graphic illustration of certain physical characteristics of aluminum wire produced in accordance with processes known in the prior art.

Referring now to FIG. 4, there is shown a plot of tensile strength, yield strength and elongation percentages versus the frequency of occurrences of a given condition in 20 AWG gauge E.C. grade aluminum wires produced by a prior art process in which hard drawn 19 gauge wire was batch annealed and then drawn to its final 20 AWG gauge reduction of the wire. As seen in FIG. 4, the median yield strength is approximately 12,800 p.s.i. and the median elongation is approximately 4.7 percent.

Figure 5:
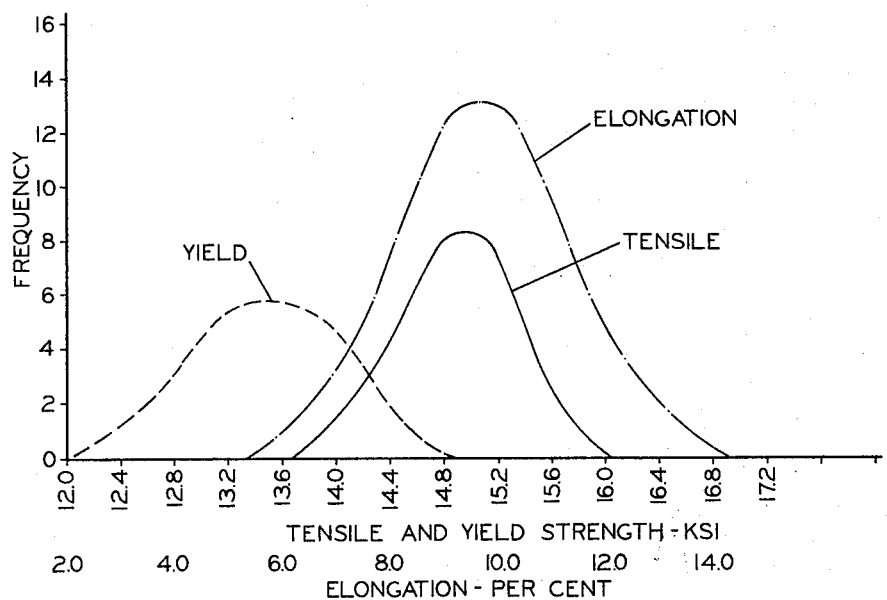
FIG. 5 is a graphic illustration of certain physical characteristics of new and improved aluminum conductors produced by methods and apparatus embodying certain principles of the invention.

FIG. 5 illustrates a graph plotting of the same information as FIG. 4 for 20 gauge E.C. grade aluminum wire produced by the process of the present invention. The present invention provides the capability of producing aluminum wire having a median yield strength of approximately 13,400 p.s.i., a median tensile strength of approximately 15,000 p.s.i. and a median elongation of approximately ten percent. By using the present invention, the yield and tensile strengths of the aluminum wire have been increased slightly and the median elongation percentage has been increased from approximately 4.7 percent to approximately ten percent.

In producing 20 gauge E.C. grade aluminum wire at about 3,150 feet per minute having the characteristics illustrated in FIG. 5, hard drawn 8 or 10 gauge wire is advanced from the supply 24, as shown in FIG. 1, and drawn down to 19 gauge by the multi-die wire drawing machine 26. Due to repeated passes through the dies 41—41 of the multi-die wire drawing machine 26, the aluminum wire 21 receives additional cold working which increases the internal strain of the wire to a point where the wire will rapidly respond to the temperature increase encountered as it passes through the annealer 28. While in the annealer 28, the temperature of successive sections of the wire 21 is elevated from approximately 180° F. to a range of 630° F. to 680° F., relieving the wire of most internal strains and making the wire extremely ductile. Since the wire 21 enters the annealer 28 in a highly stressed condition, it is more easily able to undergo a full anneal during the short time that successive portions of it are in the annealer. Furthermore, since the wire 21 is resistance heated by a current induced therein by the transformer 56, the wire will be heated through its entire cross section, insuring that the inside of the wire will be hot and annealed. While in the annealer, successive portions of the wire 21 are advanced at a rate of 2520 feet per minute over a loop path of 12.5 feet. In order to properly anneal the wire 21, the transformer 56 is operated at a frequency of 60 Hz., voltage of 54 volts and a current of 160 amperes.

The facilities 60 for controlling the annealer 28 with respect to changes in the tandem operation together with the line speed and the proximity of the single-pass wire drawing member 31 to the annealer insures that the temperature of the wire 21 entering the oil bath 32 is maintained at a temperature at least equivalent to the strain recrystallization temperature of the aluminum.

The aluminum wire 21 undergoes a single AWG gauge reduction of approximately 20 percent in the die 77 (FIGS. 2 and 3) while still at an elevated temperature from the annealing process and while immersed in the oil 32 which is usually a mineral oil with oxidation reducing additives such as Cindol 625.

The oil 32 circulating in the single-pass wire drawing machine 31 is generally maintained at a temperature which is high enough so that as the wire 21 passes through the die 31, the temperature of the wire will not drop below approximately 200° F. which is believed to be in the strain recrystallization temperature for wire made from ultra-pure aluminum. The wire 21 is thus deformed at a temperature which is above ambient with a temperature gradient believed to exist between the core and surface portions of the wire. The oil temperature range which seemed most satisfactory for the process of this example appeared to be about 160° F. within the tank 75.

Experiments have shown that the temperature of the wire 21 climbs from about 180° F. to a range of 630° F. to 680° F. during the annealing process and drops about 300° F. before it leaves the single-pass wire drawing machine 31. The temperature of the wire 21, therefore, is controlled relative to the strain recrystallization temperature of the wire material while the wire is in the single-pass wire drawing machine 31.

Successive portions of the wire 21 are advanced a distance of four inches through the oil 32 before passing through the diamond die 77. After passing through the die 77, successive portions of the wire 21 are then advanced through the oil 32 for a distance of 11 inches before being wrapped once around the capstan 79 which has a diameter of seven inches. Upon leaving the capstan, successive portions of the wire 21 travel eight inches through the oil 32 before exiting through the wiper die 80, which reduces the cross section of the wire 21 approximately one mil or less. The moving strand of wire 21 is positioned approximately one and one half-inches below the top surface of the oil 32.

The aluminum line 22, however, has great flexibility and the properties of the wire 21 may be altered by changing the drawing speeds, the annealing exposures, annealing temperature, etc., the percent reductions and the temperature of the lubricating oil 32 in which the wire is drawn to its final diameter. In other words, by controlling these various parameters, the curves of FIG. 5 may be shifted and the structural characteristics of the wire 21 altered.

After the insulation is extruded onto the wire 21 to form the insulated conductor 23 and the insulated conductor has cooled in the water pipe 35, the wire undergoes a reverse bending process by virtue of passing over the sheaves 103, 104 and 106 of the control capstan 38, the bare wire detector 107 and various sheaves 114, 116, 117 and 118 of the accumulators 112 and 113. Since the insulated conductor 28 containing the wire 21 tends to twists as it advances over the various sheaves 103, 104, 106, 114, 116, 117 and 118, the wire, in effect bends in many directions relative to its axis and thereby undergoes reverse bending. The reverse bending tends to equalize stress in the wire 21 so as to increase the percentage elongation and the fatigue resistance of the wire.

Example B.—24 Gauge Aluminum Allow Wire

Aluminum insulated conductor 23 of a 24 gauge size may be manufactured in accordance with the herebefore described process with only minor variations in process control. However, the composition of the aluminum wire 21 differs in that an alloy as opposed to an E.C. grade aluminum must be used. Generally, an alloy composition which consists of 0.75 percent iron, 0.14 percent magnesium and 0.08 percent silicon with the remainder aluminum yields a conductor with acceptable characteristics.

Aluminum insulated conductor of 24 gauge size produced from aluminum wire having the above-mentioned composition has been found to have a yield strength of 19,000 p.s.i., tensile strength of 22,000 p.s.i. and an elongation of four percent. To produce this conductor requires an annealer temperature of approximately 600° F., transformed frequency of 60 Hz., line speed of 2000-3000 feet per minute and an annealer loop of approximately ten feet in length.

The examples, supra, indicate that insulated aluminum conductor produced by the methods and apparatus of this invention possess mechanical properties which are superior to those of wire which is drawn, batch annealed and then drawn to a final diameter. Apparently, these properties ensue as a result of the control exercised over the wire 21, especially the temperature thereof, between the entrance thereof into the multi-pass wire drawing machine 26 until the wire is advanced into the extruder 34.

Of course, the wire 21 is cold drawn in the multi-pass wire draw machine 26 and is then "flash" annealed, whereupon the temperature of the wire increases from about 180° F. to approximately 630° F. to 680° F. The annealing subjects the wire to a strain recrystallization to re-establish a crystallized grain structure to remove some of the adverse effects of the cold working prior to final draw. However, the sections of the wire 21 are not in the annealer 28 a time sufficient to obtain full grain growth.

The sections of the wire 21 having a fine grain structure are advanced into the single pass wire drawing machine 31 at a temperature of about 600° F. which is generally above the strain recrystallization temperature of the aluminum. The strain recrystallization temperature of pure aluminum may be approximately 200° F., but with impurities rises to perhaps the 500° F. range. With the temperature of the oil bath 32 at approximately 160° F., and controlled to maintain the temperature thereof substantially below the strain recrystallization temperature of the aluminum, the sections of the wire 21 exit from the bath at approximately 250° to 330° F.

The wire 21 exiting from the oil bath 32 has a generally fine grain structure with a somewhat drawn out grain structure in the core thereof. The grain structure which is over-all finer than that achieved in a batch process may contribute to the improved properties. It is believed that during a "warm work" in the final draw, at least some degree of strain hardening is imparted to the outermost fibers of the wire 21 to improve the tensile and yield strengths while not reducing the ductility. There is some thought that the adverse effects of the work hardening may not be retained and hence not adversely affect the mechanical properties of the wire.

While the temperature of the wire 21 being reduced to a final diameter in the die 77 has never been measured, it is believed that a temperature gradient may exist across the section thereof. Because of the proximity of the die 77 to the entrance of the tank 75 and the elevated temperature of the oil 32, the temperature of the core may be substantially higher than the surface temperature.

The properties of the wire 21 may be controlled by changing one or more of the several parameters involved in the process. These parameters include, for example, the length of the wire 21 within the bath 32, the speed of the wire, the temperature of the oil bath, the spacing of the equipment and the percent reduction in the secondary or single pass wire drawing machine 31.

It is understood that the term "aluminum," unless otherwise indicated means aluminum or one of the alloys of aluminum in which aluminum is the primary constituent.

It is to be understood that the above-described embodiments are simply illustrative of the invention and that many other embodiments can be devised without departing from the scope and spirit of the invention.

What is claimed is:

1. In a method of processing wire which is made of commercially pure electrical conductor grade aluminum, comprising the steps of:
   advancing successive sections of wire along a predetermined path of travel;
   mechanically working the successive sections of the wire to reduce the diameter thereof;
   strand annealing the successive sections of the wire by inductive resistance heating successive sections of the wire in order to anneal the successive sections while advancing the successive sections of the wire through a path of travel forming at least a part of an electrical circuit with predetermined incoming and exiting portions of the wire being in overlapping electrical engagement with each other; while
   controlling the forces between overlapping portions of the wire and surfaces supporting the incoming and exiting portions of the wire in overlapping electrical engagement;
   causing the wire, while the sections still retain residual heat, from being annealed and have a temperature in the range of 600° F. to 680° F. at least equivalent to the recrystallization temperature of the aluminum material to enter a bath of lubricating fluid which is maintained at a temperature in the range of 100° F. to 250° F.;

further mechanically working the successive sections of the wire in the bath by reducing the successive sections of the wire to a desired diameter; and regulating the temperature of the wire during the processing thereof including the temperature of the wire during annealing in the range of 630° F. to 680° F. and the temperature at which the wire is advanced into the bath and the temperature at which the wire is further mechanically worked all relative to the recrystallization temperature of the aluminum to obtain at least some degree of strain hardening of the aluminum as the wire is worked mechanically to reduce the successive sections of the wire in the lubricating fluid bath and to produce a wire having a relatively high fatigue resistance in addition to yield strengths in the range of 12,800 p.s.i. to 14,400 p.s.i., tensile strength in the range of 14,300 p.s.i. to 15,600 p.s.i. and percentages of elongation within the range of 8 percent to 12 percent.

2. The method of claim 1, which also includes:
reverse bending the wire to distribute stresses in the wire to prevent excessive stress concentrations in the wire.

3. The method of claim 2, wherein:
the fluid bath includes mineral oil containing oxidation-reducing additives;
withdrawing the wire from the bath through a wiping die which is contiguous to the bath and finishes the wire by slightly reducing the diameter of the wire so that the wire exits from the wiping die in a finished condition at a temperature in the range of 250° to 300° F.

4. A method of continuously processing wire which is made of a commercially pure electrical conductor grade aluminum material to produce an insulated conductor, comprising the steps of:
advancing successive sections of a wire made of a commercially pure electrical conductor grade aluminum along along a predetermined path of travel;
reducing the cross-sectional area of the successive sections of the wire by cold drawing the successive sections of the wire from an initial diameter to a diameter within one gauge of a final diameter by passing the successive sections of the wire through a series of dies of successively decreasing diameters as the successive sections of the wire are being advanced;
strand annealing the successive sections of the wire by inductive resistance heating of the wire while advancing the successive sections of the wire through a path of travel forming at least part of an electrical circuit, the successive sections of the wire being heated by electrical current being passed through successive sections of the advancing wire;
further reducing the cross-sectional area of the successive sections of the wire while regulating the extent of the further reduction;
extruding insulative material onto successive sections of the wire to form an insulated conductor;
reverse bending successive sections of the insulated conductor to distribute stresses in the successive sections of the insulated conductor to prevent excessive stress concentrations in the successive sections of the insulated conductor; while
regulating the temperature of the successive sections of the wire to anneal the wire in accordance with a predetermined time-temperature relationship and to further reduce the cross-sectional area of the wire while the temperature of the wire being further reduced in cross-sectional area is within a predetermined temperature range, the combination of steps including temperature regulation causing the wire processed to have a relatively high fatigue resistance in addition to yield strengths in the range of 12,800 p.s.i. to 14,400 p.s.i., tensile strengths in the range of 14,300 p.s.i. to 15,600 p.s.i. and percentages of elongation within the range of 8 to 12 percent.

5. The method of claim 4, wherein the temperature of the wire being further reduced in cross-sectional area is regulated to obtain at least some degree of strain hardening of the material by controlling the heat loss from the successive sections of the material between the time of annealing and the time of further reducing the cross-sectional area thereof.

6. The method of claim 4, wherein the insulative material is an expanded insulative material with the temperature of the wire prior to extrusion of the insulative material thereon being controlled to maintain the temperature above that which would result in incomplete expansion of the insulative material and to maintain the temperature below that which causes large voids in the insulative material to be formed contiguous the wire and which results in a nonhomogeneous insulative material.

7. The method of claim 4, further including the step of transferring heat out of successive sections of the wire material into a liquid medium and into a heat sink immersed in the liquid medium for a predetermined length of time after the successive sections of the wire material have been further reduced in cross-sectional area, wherein the liquid medium is mineral oil with oxidation-reducing additives, the mineral oil both lubricating successive sections of the wire material as the sections are reduced in area and cooling the successive sections of the wire material after the sections have been further reduced in cross-sectional area.

8. A method of continuously processing wire which is made of an aluminum alloy material to produce an insulated conductor, comprising the steps of:
advancing a wire made of an aluminum alloy along a predetermined path of travel;
reducing the cross-sectional area of the wire by cold drawing the wire from an initial diameter to a diameter within one gauge of a final diameter by passing the wire through a series of dies of successively decreasing diameters as the wire is being advanced;
strand annealing the wire by inductive resistance heating of the wire while advancing the wire through a path of travel forming at least part of an electrical circuit, the wire being heated by electrical current being passed through the advancing wire;
further reducing the cross-sectional area of the wire while regulating the extent of the further reduction;
extruding insulative material onto the wire to form an insulated conductor;
reverse bending successive sections of the insulated conductor to distribute stresses in the insulated conductor to prevent excessive stress concentrations in the insulated conductor; and
regulating the temperature of the aluminum alloys wire to anneal the wire in accordance with a predetermined time-temperature relationship and to further reduce the cross-sectional area of the wire while the temperature of the wire being further reduced in cross-sectional area is within a predetermined temperature range, the combination of steps including temperature regulation causing the wire processed to have a relatively high fatigue resistance in addition to yield strength of approximately 19,000 p.s.i., a tensile strength of approximately 22,000 p.s.i. and an elongation of approximately 4 percent.

9. A method of continuously processing wire which is made of a metallic material selected from the group consisting of pure electrical conductor grade aluminum and aluminum alloy to produce an insulated conductor, comprising the steps of:
advancing successive sections of the wire along a predetermined path of travel;
reducing the cross-sectional area of the successive sections of the wire by cold drawing the successive sections of the wire from an initial diameter to a diameter within one gauge of a final diameter by passing the successive sections of the wire through a series of dies of successively decreasing diameters as the successive sections of the wire are being advanced;

cooling and cleaning successive sections of the reduced wire in a trichlorotrifluoroethane bath;

introducing inductively current into the successive sections of the cooled and cleaned wire and resistance heating the successive sections of the cooled and cleaned wire to a temperature within the range of 630° F. to 680° F. while advancing the successive sections of the wire through a path of travel forming a closed electrical loop extending through a core of a low frequency transformer;

causing the successive sections of the wire while still retaining residual heat from being annealed to enter and be passed through a freely circulating bath of mineral oil containing oxidation-reducing additives which is maintained at a temperature in the range of 100° F. to 250° F. while being freely circulated;

regulating the annealing current while compensating for other line conditions to anneal the wire such that the temperature of the wire entering the bath of mineral oil is maintained at a temperature at least equal to the recrystallization temperature of the metallic material;

mechanically working the successive sections of the wire to reduce further the successive sections of the wire to the desired final diameter by drawing the successive sections of the wire through a single diamond die immersed in the circulating mineral oil bath to produce wire of almost the final desired diameter;

further advancing successive sections of the wire through the circulating mineral oil bath;

wrapping the successive sections of the wire once around a rotating metal capstan which is submerged in the circulating mineral oil bath and is used to pull successive sections of the wire through the single die;

further advancing the successive sections of the wire through the circulating mineral oil bath;

withdrawing the successive sections of the wire from the bath through a wiping die which is contiguous to the bath and finishes the successive sections of the wire by slightly reducing the diameter of the successive sections of the wire so that successive sections of the wire exit from the wiping die in a finished condition at a temperature in the approximate range of 250° F. to 330° F.;

advancing successive sections of the finished wire through a trichlorotrifluoroethane bath maintained at a temperature within the range of from 40° F. to 50° F. to clean the successive sections of the finished wire and lower the temperature of the successive sections of the finished wire to a temperature in the approximate range of 210° F. to 240° F.;

further controlling the temperature of the wire prior to subsequent extrusion of an insulative material thereon to control the amount of adhesion between the successive sections of the finished wire and insulative material extruded thereon and to control the homogeneity of the insulative material;

extruding insulation onto successive sections of the cooled finished wire to form an insulated conductor;

cooling successive sections of the insulated conductor to solidify the insulation on successive sections of the wire while controlling the drag on the insulated conductor to reduce the frequency of breaks in the wire and undue elongation during the processing; and reverse bending successive sections of the insulated conductor to distribute stresses in successive sections of the wire of the conductor to prevent excessive stress concentrations in the successive sections of the wire;

the wire processed in accordance with the steps of the method including regulating the temperature having a relatively high fatgue resistance in addition to yield strengths in the range of 12,800 p.s.i. to 14,400 p.s.i., tensile strengths in the range of 14,300 p.s.i. and 15,600 p.s.i. and percentages of elongation within the range of 8 percent to 12 percent.

10. A method of continuously processing wire which is made of commercially pure electrical conductor grade aluminum to produce a twenty AWG gauge insulated conductor, comprising the steps of:

advancing successive sections of ten gauge aluminum wire along a predetermined rate of speed;

reducing the cross-sectional area of the successive sections of the ten gauge wire by cold drawing the successive sections of the wire from ten AWG gauge to nineteen AWG gauge by passing the successive sections of the wire through a series of dies of successively decreasing diameters as the successive sections of the wire are being advanced;

cooling and cleaning successive sections of the reduced nineteen gauge wire in a trichlorotrifluoroethane bath maintained at a temperature within the range of from 40° F. to 50° F:

heating successive sections of the cooled and cleaned wire to a temperature within the range of 630° F. to 680° F. in order to anneal the successive sections while advancing the successive sections of the nineteen guage wire at approximately 2,500 feet per minute through a path of travel forming a closed electrical loop having a length of approximately 12.5 feet and extending through a core of a low frequency transformer operating at a frequency of approximately 60 Hz., with a voltage of approximately 54 volts and a current of approximately 160 amperes;

causing the successive sections of the nineteen gauge wire, which still retain residual heat from being annealed and have a temperature in the range of 600° F. to 680° F., to enter a bath of mineral oil containing oxidation-reducing additives and being maintained at a temperature of approximately 160° F. while being freely circulating at approximately five gallons per minute;

passing the successive sections of the wire through the bath a distance of approximately four inches;

controlling the annealing of the wire to maintain the temperature of anneal within the range and to maintain the temperature of the wire entering the oil bath to be above the strain recrystallization temperature of the aluminum;

mechanically working successive sections of the wire by reducing further the successive sections of the nineteen gauge wire to a desired final diameter of twenty gauge while maintaining the temperature of the successive sections of the wire entering the bath above the strain recrystallization temperature of the aluminum in the successive sections of the wire being worked and the temperature of the bath substantially below the strain recrystallization temperature of the metal in the successive sections of the wire being mechanically worked by drawing the successive sections of the nineteen gauge wire through a single diamond die immersed in the circulating mineral oil bath to produce twenty gauge wire;

further advancing successive sections of the twenty gauge wire through the circulating mineral oil bath;

wrapping the successive sections of the twenty wire once around a rotating steel capstan of approximately seven inch diameter which is submerged in the circulating mineral oil bath and is used to pull successive sections of the wire through the twenty gauge die;

further advancing the successive sections of the twenty gauge wire through the circulating mineral oil bath;

withdrawing the successive sections of the wire from the bath through a wiping die which is contiguous to the bath and finishes the successive sections of the wire by reducing the diameters of the successive sections of the twenty gauge wire approximately 0.01 percent, so that successive sections of the wire exit from the wiping die in a finished condition at a temperature in the range of 250° F. to 330° F.;

advancing sucessive sections of the finished twenty gauge wire through a trichlorotrifluoroethane bath maintained at a temperature within the range of from 40° F. to 50° F. to clean the successive sections of the finished wire and lower the temperature of the successive sections of the finished wire to a temperature in the range of 210° F. to 240° F. so as to permit subsequent extrusion of polyethylene thereon and to control the amount of adhesion between the successive sections of the finished aluminum wire and polyethylene extruded thereon;

extruding insulation onto successive sections of the cooled twenty gauge finished wire to form an insulated conductor while controlling the temperature of the bare wire prior to extrusion within a range determined by the insulation material to be extruded thereon;

cooling successive sections of the insulation conductor to solidify the insulation on successive sections of the wire, while controlling the drag on the successive sections of the wire; and reverse bending successive sections of the insulated conductor to distribute stresses in successive sections of the wire of the conductor to prevent excessive stress concentrations in the successive sections of the wire;

the wire processed in accordance with the method including the regulation of the temperature thereof having a relatively high fatigue resistance in addition to yield strengths in the range of 12,800 p.s.i. to 14,400 p.s.i., tensile strengths in the range of 14,300 p.s.i. to 15,600 p.s.i. and percentages of elongation within the range of 8 percent to 12 percent.

References Cited

UNITED STATES PATENTS

| | | | |
|---|---|---|---|
| 3,503,918 | 3/1970 | LaSota et al. | 117—232 X |
| 3,523,820 | 8/1970 | Sheffer | 117—232 X |
| 3,565,685 | 2/1971 | Suzuki | 117—232 X |
| 3,516,859 | 6/1970 | Gerland et al. | 117—232 X |
| 436,968 | 9/1890 | Edison | 72—286 X |
| 1,023,316 | 4/1912 | Hurwitz | 72—286 X |
| 1,178,863 | 4/1916 | Lauber et al. | 148—11.5 A |
| 1,931,913 | 10/1933 | Ennor | 148—11.5 A |
| 2,057,582 | 10/1936 | McKean et al. | 72—286 X |
| 3,047,934 | 8/1962 | Magner | 264—265 X |
| 3,220,891 | 11/1965 | Templeton et al. | 148—11.5 A |
| 3,264,143 | 8/1966 | Turner | 148—11.5 A |
| 3,513,250 | 5/1970 | Schroerner | 148—11.5 X |
| 3,556,872 | 1/1971 | Jagaciak | 148—11.5 A |
| 3,663,216 | 5/1972 | Hunsicker | 148—11.5 AX |

OTHER REFERENCES

Aluminum-Conductor Cable Alternative to Copper, F. W. Horn et al., Bell Lab. Record, November 1967, pp. 314–319.

ALLEN B. CURTIS, Primary Examiner

U.S. Cl. X.R.

29—527.4; 72—286; 117—232; 148—156; 219—153, 154; 264—265

UNITED STATES PATENT OFFICE
CERTIFICATE OF CORRECTION

Patent No. 3,826,690      Dated July 30, 1974

Inventor(s) W. E. BLEINBERGER, E. L. FRANKE, JR., J. V. GALLOWAY, G. W. RICHARDSON, A. R. THOMAS and P. D. THOMAS It is certified that error appears in the above-identified patent and that said Letters Patent are hereby corrected as shown below:

In the specification, Column 1, line 20, "contnuous" should read --continuous--. Column 3, line 36 "fifteen" should read --fifteenth; line 39 second "F" should read --E--; line 55 following "level" insert --together--. Column 7, line 18 "phyical" should read --physical--.

Column 15, line 18 "coil" should read --oil--. Column 21, line 18 "strength" should read --strengths--; line 33 "300°F" should read --330°F--; line 41 delete the first word "along".

Signed and Sealed this twenty-second Day of July 1975

[SEAL]

Attest:

RUTH C. MASON  
Attesting Officer

C. MARSHALL DANN  
Commissioner of Patents and Trademarks